US008253787B2

(12) United States Patent
Yamamoto

(10) Patent No.: US 8,253,787 B2
(45) Date of Patent: Aug. 28, 2012

(54) MAGNIFYING ATTACHMENT FOR A CAMERA

(75) Inventor: Masao Yamamoto, Tokyo (JP)

(73) Assignee: Scalar Corporation, Tokyo (JP)

( * ) Notice: Subject to any disclaimer, the term of this patent is extended or adjusted under 35 U.S.C. 154(b) by 869 days.

(21) Appl. No.: 11/908,070

(22) PCT Filed: Mar. 7, 2006

(86) PCT No.: PCT/JP2006/304842
§ 371 (c)(1),
(2), (4) Date: Nov. 17, 2008

(87) PCT Pub. No.: WO2006/095898
PCT Pub. Date: Sep. 14, 2006

(65) Prior Publication Data
US 2009/0093274 A1   Apr. 9, 2009

(30) Foreign Application Priority Data

Mar. 9, 2005   (JP) .................................. 2005-064858

(51) Int. Cl.
*H04N 7/18*   (2006.01)
(52) U.S. Cl. .......................................... 348/79; 348/375
(58) Field of Classification Search .................. 348/360, 348/240, 373, 79, 80, 375; 359/81; 396/432
See application file for complete search history.

(56) References Cited

U.S. PATENT DOCUMENTS

| 4,967,214 | A | * | 10/1990 | Taniguchi et al. | 396/71 |
|---|---|---|---|---|---|
| 5,071,241 | A | * | 12/1991 | Brock | 359/390 |
| 5,144,478 | A | * | 9/1992 | Toshimitsu | 359/392 |
| 5,146,256 | A | * | 9/1992 | Frosig et al. | 396/544 |
| 5,214,538 | A | * | 5/1993 | Lobb | 359/691 |
| 5,672,861 | A | * | 9/1997 | Fairley et al. | 250/201.3 |
| 5,880,465 | A | * | 3/1999 | Boettner et al. | 250/234 |
| 6,052,534 | A | * | 4/2000 | Goto | 396/71 |
| 6,147,797 | A | * | 11/2000 | Lee | 359/363 |
| 6,157,781 | A | * | 12/2000 | Konno et al. | 396/71 |
| 6,327,078 | B1 | * | 12/2001 | Lee | 359/363 |
| 6,393,431 | B1 | * | 5/2002 | Salvati et al. | 1/1 |

(Continued)

FOREIGN PATENT DOCUMENTS

JP   2000-292696   10/2000

(Continued)

OTHER PUBLICATIONS

Makinen, et al., "Add-on Laser Reading Device for a Camera Phone"; SPIE vol. 5962, 2005.*

(Continued)

*Primary Examiner* — Jason Chan
*Assistant Examiner* — Gary C Vieaux
(74) *Attorney, Agent, or Firm* — Plumsea Law Group

(57) ABSTRACT

The object of this invention is to provide a magnifying attachment to be attached to a camera by which a high magnification image can be obtained without appearing a part having no image in the image. The magnifying attachment has a magnifying objective lens (21A), a field lens (21B) for converting a light passed through the objective lens (21A) into collimated light, and a converging lens (21C) for focusing the collimated light on a camera lens (42). Light passed through the converging lens (21C) is converged on a pupil (42X) of the camera lens (42) with a solid angle exceeding the view angle of the camera lens (42).

13 Claims, 11 Drawing Sheets

U.S. PATENT DOCUMENTS

| | | | |
|---|---|---|---|
| 6,540,415 B1 * | 4/2003 | Slatter et al. | 396/428 |
| 6,587,152 B1 * | 7/2003 | Sharp et al. | 348/373 |
| 6,781,630 B2 * | 8/2004 | Nomura et al. | 348/335 |
| 6,888,673 B2 * | 5/2005 | Reynolds | 359/368 |
| 7,079,227 B2 * | 7/2006 | Rembe et al. | 356/23 |
| 7,330,213 B2 * | 2/2008 | Yamamoto | 348/357 |
| 7,922,402 B2 * | 4/2011 | Gaertner et al. | 396/428 |
| 2002/0012045 A1 * | 1/2002 | Nomura et al. | 348/75 |
| 2002/0030883 A1 * | 3/2002 | Adachi et al. | 359/368 |
| 2002/0186316 A1 * | 12/2002 | Baron | 348/373 |
| 2004/0218081 A1 * | 11/2004 | Lohr et al. | 348/335 |
| 2005/0228229 A1 * | 10/2005 | Harris | 600/168 |
| 2008/0275315 A1 * | 11/2008 | Oka et al. | 600/306 |

FOREIGN PATENT DOCUMENTS

| | | |
|---|---|---|
| JP | 2001-027780 | 1/2001 |
| JP | 2003-315905 | 11/2003 |
| JP | 2004-279733 | 10/2004 |
| JP | 2005278134 A * | 10/2005 |
| JP | 2006154660 A * | 6/2006 |
| WO | WO9904302 | 1/1999 |
| WO | WO 2005016135 A1 * | 2/2005 |

OTHER PUBLICATIONS

International Search Report Dated May 2, 2006.

Extended European Search Report dated Jun. 24, 2010 in Application No. PCT/JP2006304842.

Response dated Jan. 11, 2011 in European Patent Application No. 06728958.7.

* cited by examiner

MAGNIFYING ATTACHMENT FOR A CAMERA

TECHNICAL FIELD

The present invention relates to a magnifying attachment attached to and used with a camera.

BACKGROUND OF THE INVENTION

In recent years, mobile phones have been remarkably widespread. One of the factors resides in that the popularity of camera-equipped mobile phones has increased.

The camera-equipped mobile phones are literally mobile phones with a camera. The camera of the camera-equipped mobile phone is designed in such a manner that imaging means that is normally a charge coupled device (CCD) is incorporated into a common case of the mobile phone, and a camera lens that guides an image light to the imaging means is mounted at a given position of the case in such a state that the camera lens is exposed from the case.

The camera-equipped mobile phone is configured as described above to carry out photography.

The camera-equipped mobile phone has a function of making photography easier by an aid of the mobile phone that is frequently carried. The camera-equipped mobile phone also has a function, which is not provided to the conventional cameras, of attaching a picture that has been taken by the camera-equipped mobile phone to an electronic mail that is realized by an electronic mail function of the mobile phone so as to be transmitted to another mobile phone without the aid of another device in many cases. Those characteristic functions are to provide new pleasure that is not supplied by the conventional camera.

With the above-mentioned characteristic function, the camera-equipped mobile phone succeeds in stimulating a sense of fun of a user, and has been widely widespread among people who frequently take a picture, in particular, young people.

In view of the above-mentioned circumstances, in order to further spread the camera-equipped mobile phones, it can be understood that something to further stimulate a sense of fun of the user is required.

Taking this point into consideration, a study for providing the camera-equipped mobile phone with a function of further stimulating the sense of fun of the user has been conducted.

For example, an image that can be taken by the camera-equipped mobile phone had been only a still image before, but a moving image or a frame-by-frame advance image can be now also taken. Also, recent camera-equipped mobile phones have a function of storing a given image in a memory that is incorporated into the camera-equipped mobile phone in advance, and then combining the stored image with an image that has been taken by the camera-equipped mobile phone.

One measure for stimulating the sense of fun of the user is to change the image that can be taken by the camera-equipped mobile phone. One of the simplest changes is to increase the magnification of the image that can be taken.

When the image having a magnification as in a telescope or a microscope can be taken, the camera-equipped mobile phone becomes a telescope or a microscope which can be easily carried, and it is assumed that the application thereof is different from that of the conventional mobile phones.

However, it is not so easy for the camera-equipped mobile phone to take the image with high magnification.

In general, a camera provided to the camera-equipped mobile phone is equipped with a lens having a viewing angle (in general, 60° to 70°) which is considered to be relatively "wide angle" among tenses provided to the cameras to enable taking an image of a person or a scene which is a main application thereof easily.

When an image light enters the above-mentioned lens having the wide viewing angle through an objective lens that is generally a magnifying lens, an area into which no image light is introduced appears in a part of the viewing angle of the lens of the camera provided to the camera-equipped mobile phone. This part is displayed as black in a final image because the image light is not introduced into the part, and as a result, the final image has a black bordering. In other words, an appropriate imaging cannot be conducted when the objective lens is merely disposed in front of the lens of the camera of the camera-equipped mobile phone.

Also, even in the case where the camera of the camera-equipped mobile phone is used as a microscope, it is necessary to deepen the focal depth in order to facilitate the focusing of a focal point on an object to be imaged, which also applies to the conventional microscope. In this case, it is necessary to narrow the image light from the object to be imaged by an aperture. In this case, a solid angle of the light that enters the lens of the camera of the camera-equipped mobile phone through the objective lens becomes small. Therefore, there tends to arise such a problem that the black region appears in the final image as described above, particularly in the case where the camera of the camera-equipped mobile phone is used as the microscope.

Even if the objective lens is added to a camera having a fixed lens other than the camera-equipped mobile phone to take a picture, the above-mentioned phenomenon that nothing other than the image partially having the black part can be imaged can occur as well.

That is, in the case where another objective lens is additionally disposed in front of the lens that is incorporated into the existing camera to take an image whose magnification is generally increased, the above-mentioned problem that images other than the image partially having the black part (generally having the black bordering) cannot be taken by merely introducing the image light that has passed through the object lens to the lens that is originally provided to the camera arises not only in the camera-equipped mobile phone, but also in the conventional cameras.

An object of the present invention is to provide a magnifying attachment for allowing a camera which includes a camera provided in the camera-equipped mobile phone to take an image at a magnification higher than a magnification at which the camera can originally take an image, which takes an image including no black part where no image can be seen.

DISCLOSURE OF THE INVENTION

The inventor of the present invention has studied the magnifying attachment for allowing a camera such as the camera-equipped mobile phone to take an image at a magnification higher than a magnification at which the camera can originally take an image, and has achieved the following magnifying attachment which is capable of obtaining an image having no black part where no image can be seen.

According to the present invention, there is provided a magnifying attachment that is attached to and used with a camera-equipped mobile phone or other cameras, and magnifies the image that is taken by the camera.

The magnifying attachment includes a main body that is detachably fixed to the camera, an objective lens that is attached to the main body, and a converging lens that is attached to the main body.

The objective lens and the converging lens are configured so that the objective lens allows an image light from an object to be imaged to pass therethrough to magnify the image light, and so that the converging lens allows the image light that has passed through the objective lens to pass therethrough to converge the passed image light on a pupil of the lens of the camera with a solid angle that is substantially equal to or larger than a viewing angle of the lens, when the main body is fitted with the camera.

The magnifying attachment includes an objective lens for taking an magnified image, and also includes a converging lens as described above. The converging lens allows the image light that has passed through the objective lens to pass therethrough, to thereby converge the image light that has passed through the converging lens on a pupil of the lens with a solid angle that is substantially equal to or larger than the viewing angle of the lens of the camera. Therefore, a part in which no image light exists is not substantially produced on the outer periphery of the lens of the camera. Accordingly, the magnifying attachment makes it possible to take an image with high magnification in a state where the black part having no image is not included using the existing camera.

The magnifying attachment according to the present invention may include a field lens that is fitted with the main body.

The field lens is configured so that the field lens allows the image light that has passed through the objective lens to pass therethrough to adjust the passed image light so as to enter the entire converging lens. At this time, the converging lens allows the image light that has passed through the field lens to pass therethrough to converge the passed image light on the pupil of the lens with a solid angle that is substantially equal to or larger than a viewing angle of the lens, when the main body is fitted with the camera.

The field lens functions to guide the light that has passed through the objective lens to the converging lens efficiently or effectively. In other words, in the case where there is no field lens, the diameter of the image light that has passed through the objective lens at the time of passing through the converging lens may be remarkably larger than the diameter of the converging lens. In this case, the image light that has passed through the converging lens and converged onto the lens of the camera is only a part of the image light that has passed through the objective lens. Therefore, the brightness of the image that is finally obtained by the camera becomes insufficient. The magnifying attachment having the field lens is capable of brightening the image that is finally obtained.

The main body of the magnifying attachment according to the present invention may be equipped with an aperture. The aperture is designed so as to deepen the focal depth by focusing the image light when the main body is attached to the camera. There are many cases in which the aperture is required in practice in the case where the camera to which the magnifying attachment is attached is intended to be used as the microscope. The aperture of the magnifying attachment according to the present invention is not disposed closer to a lens side than the field lens in a state where the magnifying attachment is used. It is needless to say that it is possible to dispose the aperture closer to a camera side than the objective lens or closer to a side of the object to be imaged than the objective lens.

The converging lens in the magnifying attachment is designed so as to converge the image light that has passed through the field lens on a lens provided to the camera with the solid angle that is equal to or larger than the viewing angle of the lens. That is, in the case where the image with high magnification is taken by the aid of the magnifying attachment, there exists no part in which the image light is not introduced within the viewing angle of the lens of the camera. As a result, the image with high magnification which is imaged by the magnifying attachment does not include the black part where no image can be seen such as the black bordering.

The converging lens may have any configuration if the above-mentioned features are provided.

The converging lens may be configured to allow the image light that has passed through the objective lens to pass therethrough to converge the passed image light within an area of the pupil of the lens provided to the camera with a solid angle that is substantially equal to a viewing angle of the lens, for example. The magnifying attachment having the above-mentioned converging lens can obtain the bright image relatively easily because the undesired image light is reduced by using the magnifying attachment.

The field lens may have any configuration if the above-mentioned features are provided.

For example, the field lens makes the image light that has passed through the objective lens pass therethrough, thereby enabling the image light that has passed through the field lens to be converted into a collimated light.

If the camera to which the magnifying attachment of the present invention is attached is used as a telescope, the field lens is not required in many cases. The reason is as follows. In the case where the camera to which the magnifying attachment of the present invention is attached is used as a microscope, the diameter of the light that has passed through the objective lens is increased. On the other hand, in the case where the camera to which the magnifying attachment of the present invention is attached is used as the telescope, because the diameter of the light that has passed through the objective lens is usually decreased, the image light is hardly wasted without using the field lens.

All of the objective lens, the field lens, and the converging lens of the present invention may be structured by a single lens, or may be structured by a plurality of lenses. The use of the plurality of lenses which are equivalent or substantially equivalent to the single lens is widely conducted, and therefore such a known technique may be applied to replace the single lens with the plurality of lenses. In the case where the objective lens or the field lens is structured by the plurality of lenses, the aperture may be disposed between the plurality of lenses that constitute the objective lens, or between the plurality of lenses that constitute the field lens.

The main body of the magnifying attachment according to the present invention is required to be detachably fixed to the camera. It is possible to provide means that can be detachably fixed to the camera to the main body itself. Also, it is possible that the main body can be made to be detachably fixed to a fixture which can be detachably fixed to the camera, and is fixed to the camera through the fixture.

There are a huge variety of cameras. In particular, there are a huge variety of camera-equipped mobile phones. Also, there is a tendency to replace the camera-equipped mobile phones frequently.

Taking the above-mentioned circumstances into consideration, unless means for fixing the magnifying attachment to the camera is designed in a certain way, when the camera (or the camera-equipped mobile phones) to which the magnifying attachment is to be fixed is replaced with another camera, there is a fear that the magnifying attachment cannot be fixed to the camera. In order to fit the magnifying attachment to various cameras, it is necessary to prepare individual means for detachably fixing the magnifying attachment to the camera for each of the cameras. If the means is fixed to the main body, the entire magnifying. attachment is required to be replaced in order to fit the magnifying attachment with another camera. If the above-mentioned latter configuration in which the fixture is used as described above and the magnifying attachment is fixed to the camera through the fixture is applied, the magnifying attachment is fitted with another camera by merely replacing the fixture so far as the structure for fixing the magnifying attachment to the fixture is identical. As a result, the economic burden on the user is suppressed.

The objective lens may be configured to be detachably attached to the main body.

Alternatively, the following configuration can be applied. The main body of the magnifying attachment according to the present invention is separated into two pieces, and these two pieces of the main body are detachably attached to each other. The objective lens is fixed to one of those two pieces of the main body, and the converging lens is fixed to the other of the two pieces of the main body, respectively.

In the case where the magnification of an image to be taken is going to be changed when the image is taken by the aid of the magnifying attachment, it is necessary to change the objective lens. However, even in such a case, it is unnecessary to change the converging lens. When the main body can be separated as described above, it is possible that the above-mentioned other piece of the main body is shared, and the above-mentioned one piece of the main body is provided multiple(each of multiple above-mentioned one piece of the main body have a different objective lens). With the above-mentioned configuration, it is possible to reduce the costs required when various images are taken by the aid of the magnifying attachment. In this case, if there is the aperture, the aperture is fitted with any one piece of the above-mentioned main body.

The objective lens and the field lens may be configured to be detachably attached to the main body. In this case, the objective lens and the field lens may be integrated.

Alternatively, the following configuration can be applied. The main body of the magnifying attachment according to the present invention is separated into two pieces, and these two pieces of the main body are detachably attached to each other. The objective lens and the field lens are fixed to one of those two pieces of the main body, and the converging lens is fixed to the other of the two pieces of the main body, respectively. With the above-mentioned configuration, it is possible to reduce the costs required when various images are taken by the aid of the magnifying attachment as in the above-mentioned case.

The magnifying attachment according to the present invention may include a lighting unit that can irradiate the object to be imaged with an illumination light when imaging is carried out.

The lighting is essential in taking an image with high magnification. The magnifying attachment having the lighting is designed so as to readily take an image with high magnification without using another lighting equipment. This magnifying attachment is effective in a case where the imaging carried out under the same conditions is always required.

Also, in the case of taking the image with high magnification, it is necessary to change the lighting based on the magnification. When the lighting is provided to the magnifying attachment as described above, the lighting is adapted to be used in taking an image by the aid of the magnifying attachment, to thereby take an appropriate image by means of its own lighting.

BRIEF DESCRIPTION OF THE DRAWINGS

FIG. 1C is a perspective view showing a state in which the case of the camera-equipped mobile phone shown in FIG. 1A is closed.

BEST MODE FOR CARRYING OUT THE INVENTION

Hereinafter, a description will be given of a preferred embodiment of the present invention with reference to the drawings.

A magnifying attachment according to this embodiment constitutes a part of a camera-equipped mobile phone attachment 1 described below. The magnifying attachment is used in a state where the magnifying attachment is fitted with a camera. However, the camera with which the magnifying attachment is fitted in this embodiment is a camera-equipped mobile phone 40 (refer to FIG. 1A).

The camera-equipped mobile phone attachment 1 is used in combination with the camera-equipped mobile phone 40.

Figure 1A:
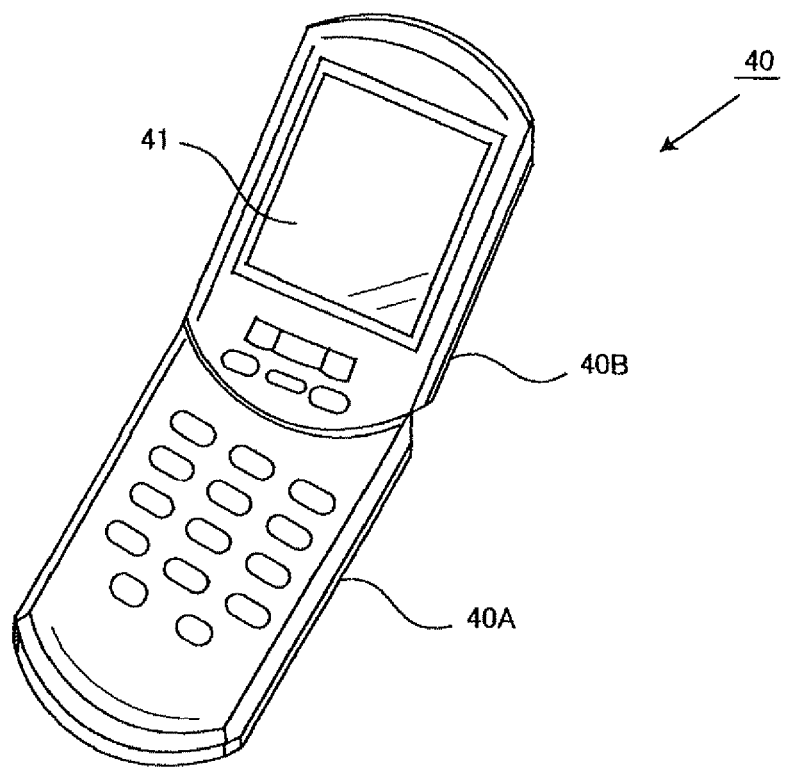
FIG. 1A is a perspective view showing a state in which a case of a camera-equipped mobile phone that is attached to a camera-equipped mobile phone attachment according to an embodiment of the present invention is opened.
Figure 1B:
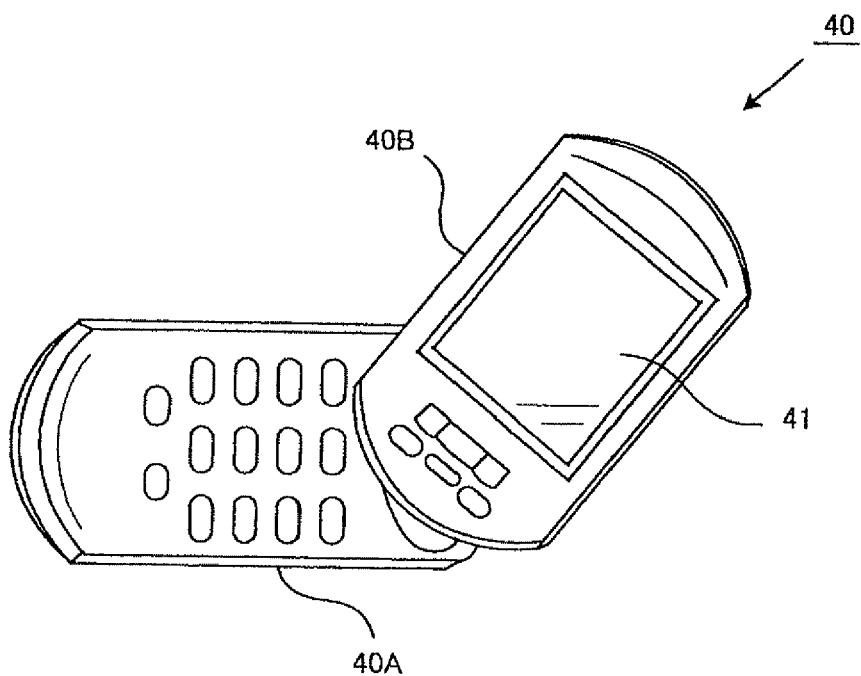
FIG. 1C is a perspective view showing a state in which two pieces of the case of the camera-equipped mobile phone shown in FIG. 1A are twisted at a portion of a universal joint.
FIG. 1D is a perspective view showing a state in which the case of the camera-equipped mobile phone shown in FIG. 1A is closed, and a cover is opened in order to take an image.

As shown in FIG. 1A, the camera-equipped mobile phone 40 according to this embodiment includes a case. The case is separated into a piece 40A in which a camera is disposed, a piece 40B in which the camera is not disposed, and both of those pieces are connected to each other by a universal joint.

The case can be doubled at a portion of the universal joint, and can be opened or closed as necessary. Also, the case is designed so as to twist one of those two pieces with respect to the other piece with the universal joint serving as an axis.

In this embodiment, the camera-equipped mobile phone 40 includes at least a mail function for transmitting or receiving an electronic mail in addition to a common phone function that is realized by a microphone, a speaker, and a circuit that controls the microphone and the speaker. In order to realize those functions, the camera-equipped mobile phone 40 includes a display 41 and an antenna not shown, and equipped with hardware such as a CPU, a ROM, a RAM, or an interface therein. However, because those components are not limited to the camera-equipped mobile phone of this type, but are commonly used for the mobile phones, the description thereof will be omitted.

The display 41 is disposed at a front side (outer side when the camera-equipped mobile phone 40 is closed) of the other piece 40B of the case that constitutes the camera-equipped mobile phone 40. One piece 40A of the case and the other piece 40B of the case are connected so as to rotate with one end of the other piece 40B which is connected to the one piece 40A of the case as a center as shown in FIG. 13. In a state where the camera-equipped mobile phone 40 is closed, the one piece 40a of the case is twisted with respect to the other piece 40B of the case by 180° such that the display 41 can be viewed from the external.

The camera-equipped mobile phone 40 also includes a camera. The camera includes an image pickup device not shown, and a camera lens 42.

The image pickup device takes an image due to the image light that is guided from an object to be imaged through the camera lens 42, and is formed of a CCD in this embodiment. The camera lens 42 can be formed of the combination of a plurality of lenses, but is formed of one lens in this embodiment. The image that is taken by the image pickup device of the camera of the camera-equipped mobile phone 40 becomes a reductive image in the case where the image is taken by the single camera-equipped mobile phone 40. Note that, in this specification, the reductive image means an image of an object that is larger than the image pickup device which is reduced and transferred to the image pickup device.

Figure 1C:
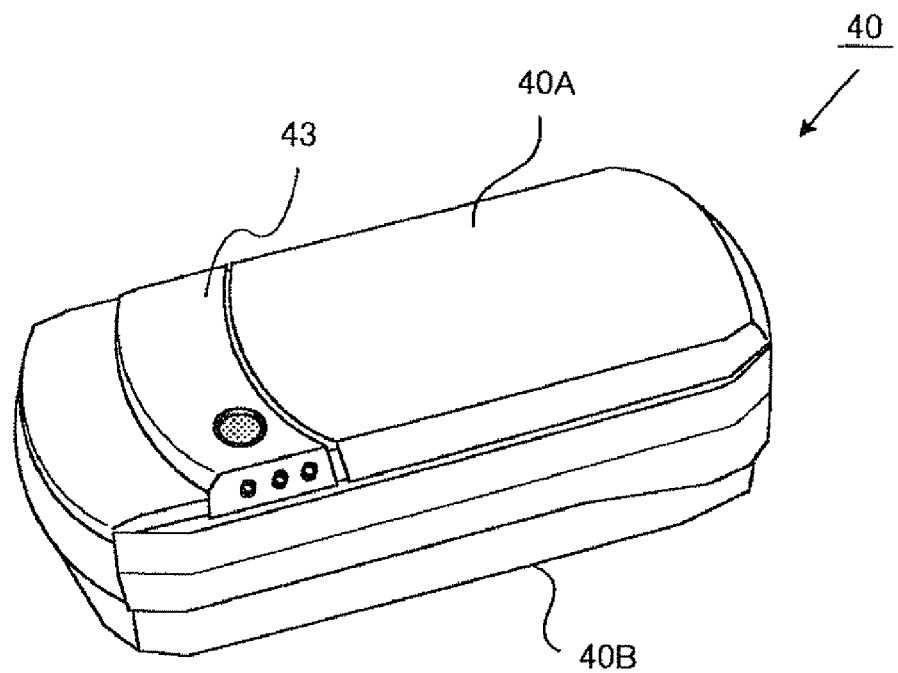
Figure 1D:
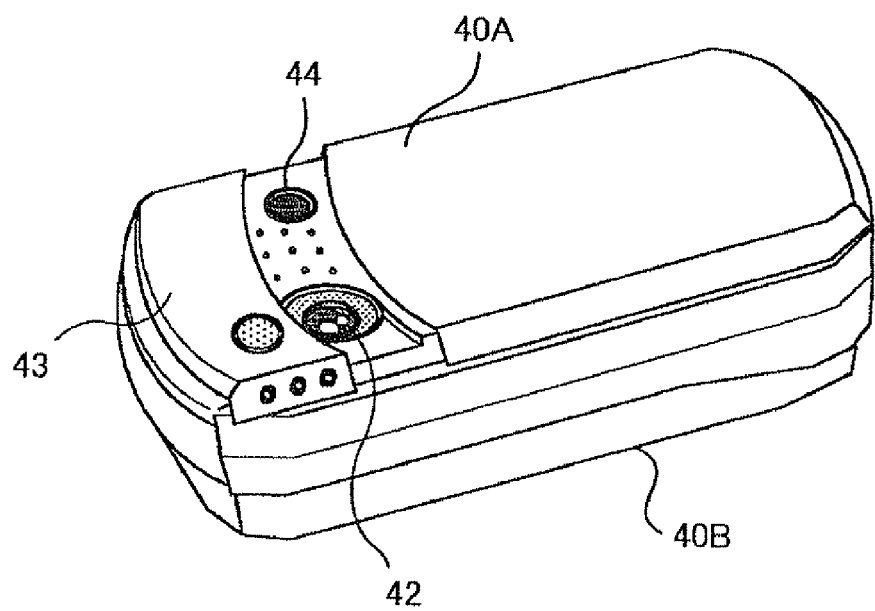

As shown in FIG. 1D, the camera lens 42 is disposed at a back side (outer side when the camera-equipped mobile phone 40 is closed) of one piece 40A of the case that constitutes the camera-equipped mobile phone 40. The camera lens 42 is not always exposed, but is exposed as necessary. The camera-equipped mobile phone 40 according to this embodiment is equipped with a camera lens cap 43. As shown in FIG. 1C, when the camera is not used, the camera lens cap 43 is designed so as to cover over the camera lens 42. The camera lens cap 43 is slidable with respect to the case 40A, and slid in the longitudinal direction of the camera-equipped mobile phone 40 so as to expose the camera lens 42 when the camera is used.

Also, a camera lighting unit 44 that enables the object to be imaged to be irradiated with an illumination light when the image is taken by the camera is disposed in the vicinity of the camera lens 42.

As the camera-equipped mobile phone 40 of the above-mentioned type, there can be employed, for example, Mova SO SOSi (trademark) that is a mobile phone which is sold by NTT DoCoMo, Inc.

The camera-equipped mobile phone attachment 1 that is attached to and used with the camera-equipped mobile phone 40 is shown in FIGS. 2 to 5.

The camera-equipped mobile phone attachment 1 magnifies the image that is taken by the image pickup device provided to the camera of the camera-equipped mobile phone 40 in a state where the camera-equipped mobile phone attachment 1 is combined with the camera-equipped mobile phone 40. In this embodiment, the camera-equipped mobile phone 40 is used as a microscope.

Figure 2:
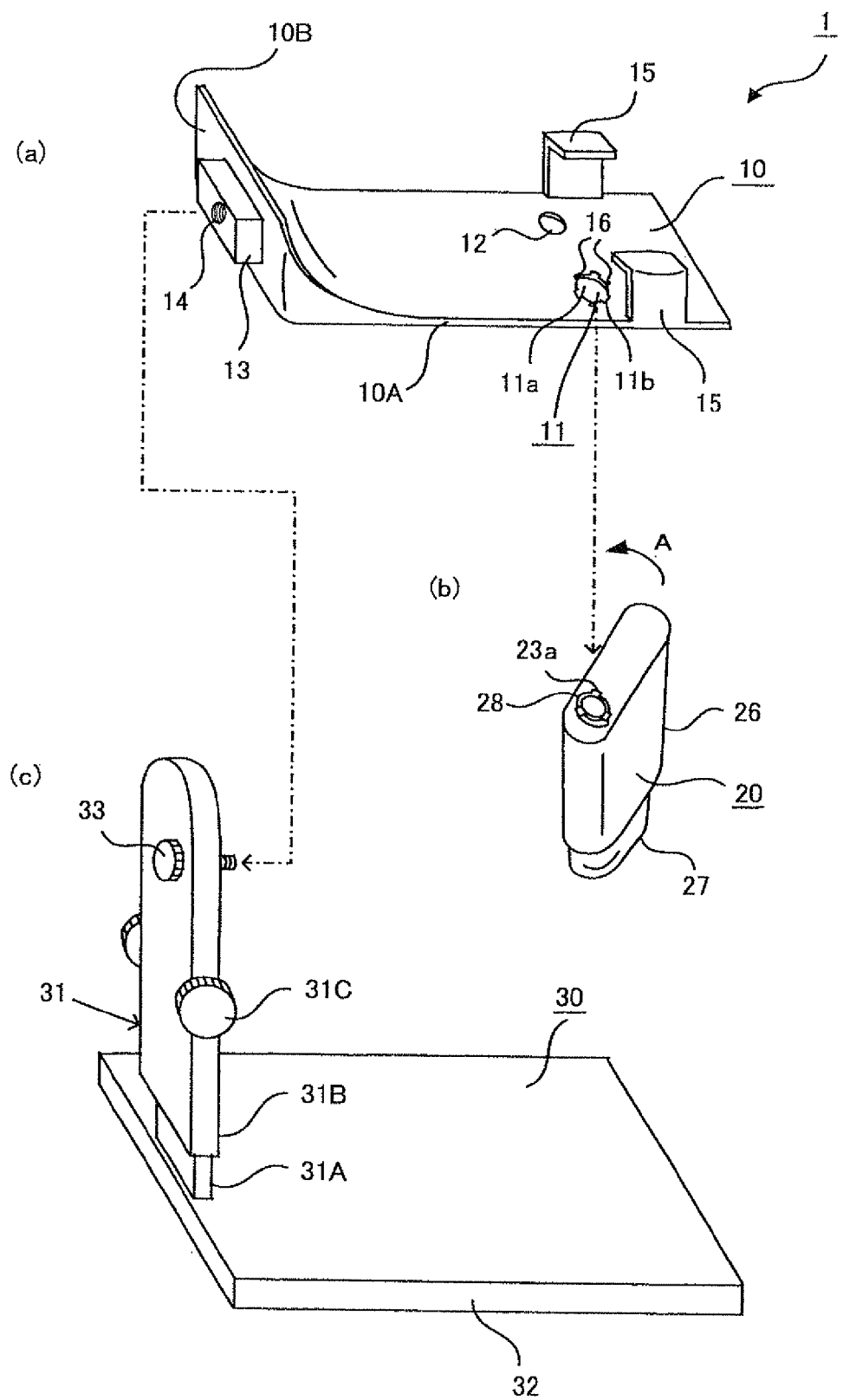
FIG. 2 are diagrams showing the respective portions of the camera-equipped mobile phone attachment according to the embodiment of the present invention.

As shown in a perspective view of FIG. 2, the camera-equipped mobile phone attachment 1 includes a base 10 that detachably fixes the camera-equipped mobile phone 40, a magnifying section 20 that magnifies the object to be imaged, and a stand 30 that supports the base 10.

The base 10, the magnifying section 20, and the stand 30 may be integrated together. However, in this embodiment, the base 10, the magnifying section 20, and the base 10, the stand 30 are detachably attached to each other.

The magnifying section 20 corresponds to the magnifying attachment of the present invention.

FIG. 2(a) shows the base 10 to which the above-mentioned camera-equipped mobile phone 40 can be attached or detached.

The base 10 can be fixed to the camera-equipped mobile phone 40 in the closed state, and corresponds to an example of a fixture of the present invention.

The base 10 is configured to provide ribs at both ends of a plate member that is bent in an L-shape in cross section in the width direction.

The width of the base 10 is slightly larger than the width of the camera-equipped mobile phone 40.

A camera opening 11 is provided at a position corresponding to the camera lens 42, and a light opening 12 is provided at a position corresponding to the camera lighting unit 44, when the camera-equipped mobile phone 40 is attached to the base 10, in a bottom plate 10A which is the largest in the area of the base 10.

The camera opening 11 and the light opening 12 are configured so as to expose the camera lens 42 and the camera lighting unit 44 from the bottom plate 10A when the camera-equipped mobile phone 40 is attached to the base 10. In this embodiment, a projection 28 of the magnifying section 20 which will be described later is fitted with the camera opening 11, to thereby realize the detachable attachment of the magnifying section 20 to the base 10.

The camera opening 11 of this embodiment has a gear-like configuration in which three notches 11b are provided at regular intervals in a substantially circular opening 11a. A rectangular solid locking piece 16 is disposed in the substantial middle portion between the respective notches 11b so as to be in contact with the opening 11a.

Also, the light opening 12 is circularly configured.

The diameter of the camera opening 11 is sufficient for ensuring the viewing field of the camera lens 42. However, when the viewing field of the camera lens 42 can be ensured, and the light from the camera lighting unit 44 is not rejected, the size and the configuration of the camera opening 11 can be freely changed. Also, the light opening 12 is circularly configured, but the size and the configuration of the light opening 12 can be freely selected if the light from the camera lighting unit 44 is not rejected.

Further, the camera opening 11 and the light opening 12 can be configured as a series of openings.

A rectangular solid member 13 is disposed on the outer side of a back surface 10B that is a rectangular plate portion which is continuous to the bottom plate 10A of the base 10. A camera screw nut 14 is provided in the rectangular solid member 13 along the longitudinal direction of the bottom plate 11A. The rectangular solid member 13 is designed so as to increase the thickness of the back surface 1013 and produce a thickness that allows the camera screw nut 14 to be provided.

In this specification, the term "camera screw nut" means a nut among bolts and nuts which are generally called "camera screw", and the term "camera screw bolt" means a bolt among the bolts and the nuts which are generally called "camera screw". The camera screw is generally a ¼ inch screw (the standard of ¼ 20UNC).

Two flexible pieces 15 for detachably fixing the camera-equipped mobile phone 40 are disposed on both sides of the bottom plate 10A of the base 10. The flexible pieces 15 are disposed along both sides of the bottom plate 10A in the width direction thereof in such a manner that the positions of the flexible pieces 15 in the longitudinal direction of the bottom plate 10A coincide with each other. Although being not limited to this configuration, each of the flexible pieces 15 is composed of a thin plate member made of a flexible resin, and configured to extend from the bottom plate 10A in the vertical direction, and bend its leading end toward a direction of another flexible piece 15.

At least one of the flexible pieces 15 may be disposed on the peripheral edge of the bottom plate 10A of the base 10. In order to enhance the locking force, a plurality of flexible pieces can be provided.

Figure 5:
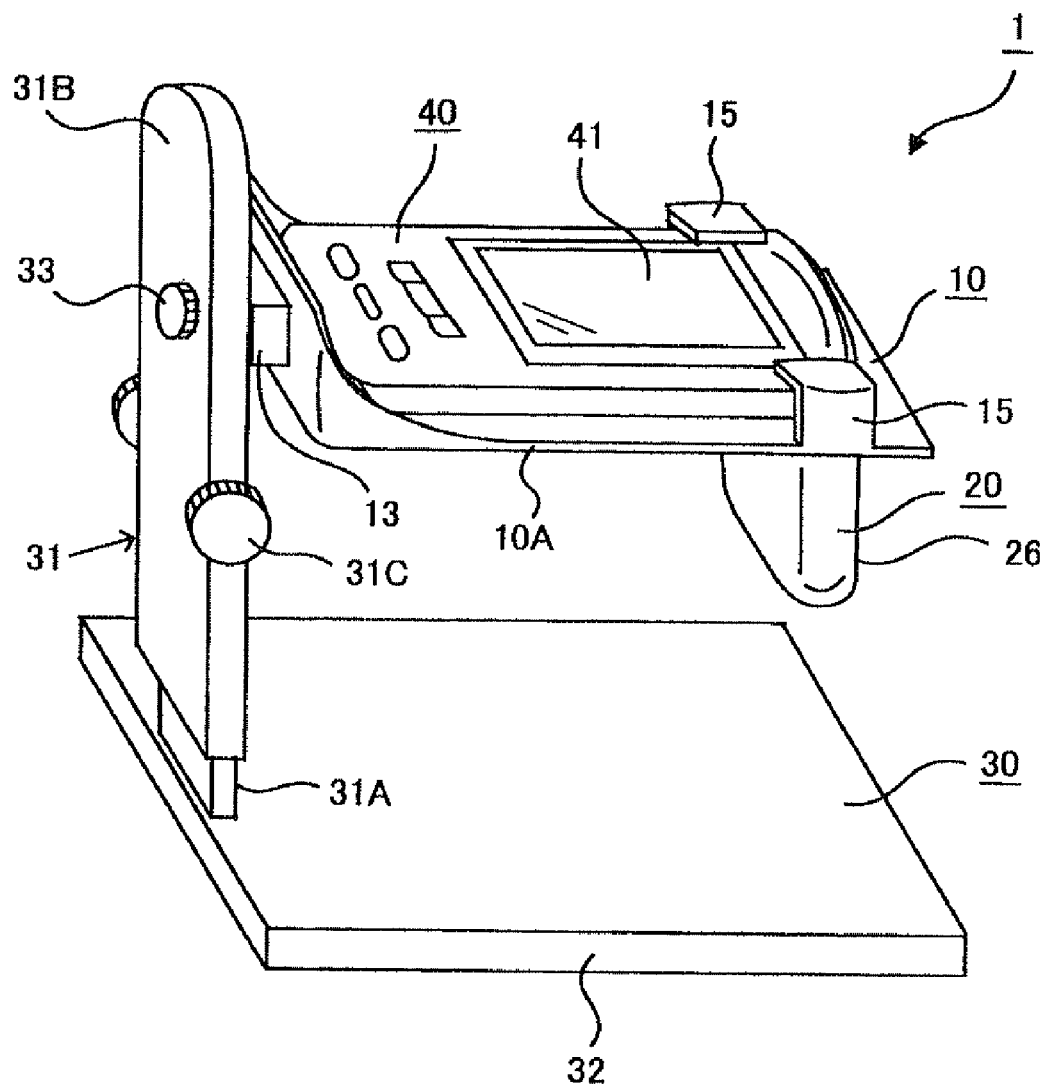
FIG. 5 is a diagram showing a state in which the camera-equipped mobile phone attachment according to the embodiment of the present invention is used as a microscope.

The camera-equipped mobile phone 40 is fitted between the bent portion of the flexible pieces 15 and the bottom plate 10A in such a manner that a surface of the camera-equipped mobile phone 40 on which the camera lens 42 is disposed is directed toward the bottom surface 10A. As a result, in a state where the display 41 is exposed from an opposite side of the bottom plate 10A, and the camera lens 42 is exposed to the camera opening 11 of the bottom plate 10A, the camera-equipped mobile phone 40 can be attached to the base 10. This state is shown in FIG. 5. The attachment is detachable.

The base 10 is not limited to the above-mentioned configuration. If the base 10 is fixed to the camera-equipped mobile phone 40 in a state where the camera can be used, and detachably fixed to the magnifying section 20, any configuration is applicable. Also, the base 10 can be fixed to the camera-equipped mobile phone 40, for example, due to a magnetic force.

The camera-equipped mobile phone attachment 1 according to this embodiment has a plurality of bases 10 having different configurations. This allows the base 10 to be fixed to the different camera-equipped mobile phone 40.

Figure 3:
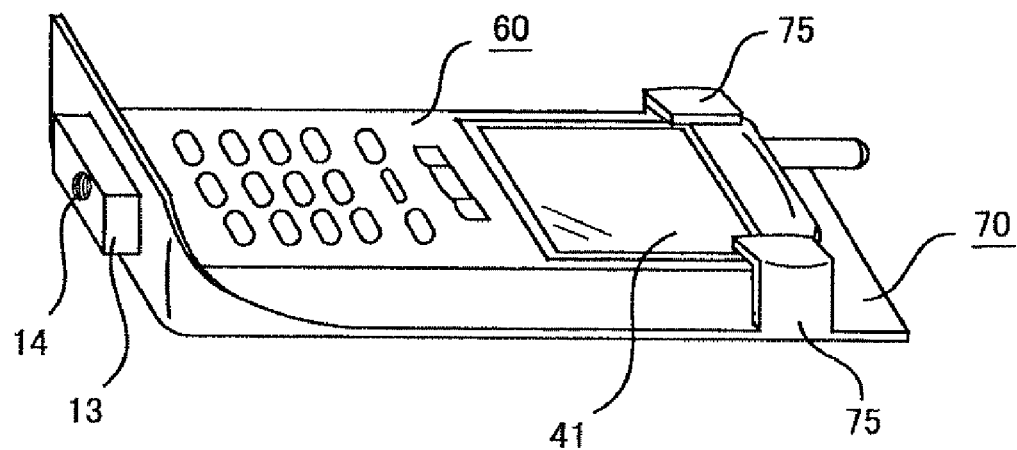
FIG. 3 is a diagram showing an example of a base of the camera-equipped mobile phone attachment according to the embodiment of the present invention.

FIG. 3 shows an example of the base corresponding to a camera-equipped mobile phone 60 which is not of the doubled type. The base 70 is not different from the base 10 described above in terms of the basic configuration. However, the configurations of the bottom plate and the flexible pieces 75, and the positions and the configurations of the camera opening and the light opening are configured so as to suit for the camera-equipped mobile phone 60.

Because the camera-equipped mobile phone attachment 1 according to this embodiment has a plurality of bases 10 having different configurations, the base can be replaced with a base corresponding to the camera-equipped mobile phone to be used, and the base can be compatible with the plurality of camera-equipped mobile phones.

Figure 4:
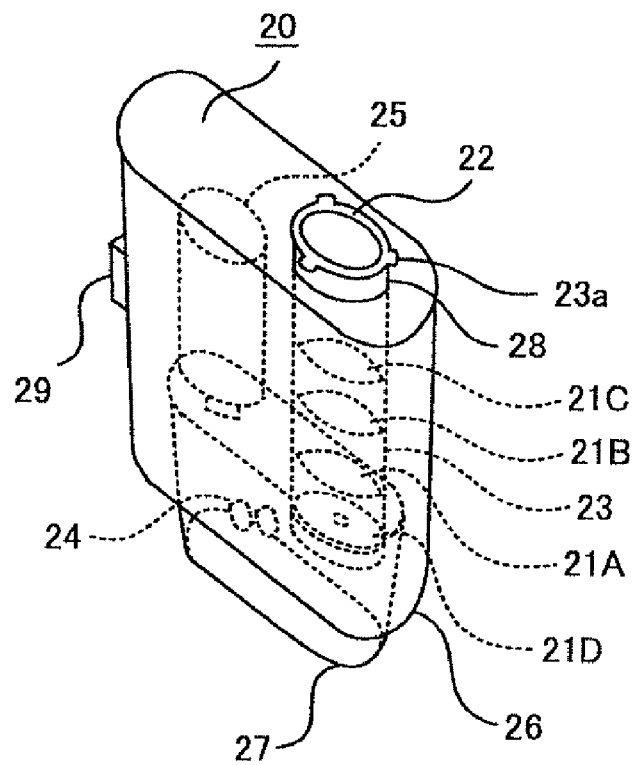
FIG. 4 is a diagram showing a magnifying portion of the camera-equipped mobile phone attachment according to the embodiment of the present invention.

FIG. 2(*b*) shows the magnifying section 20 of the camera-equipped mobile phone attachment 1 according to this embodiment, and FIG. 4 shows a partially perspective view thereof.

The magnifying section 20 includes a lens case 23 having a lens tube 22, a lighting unit 24 that irradiates the object to be imaged with a given illumination light, an illumination power supply 25, a casing 26 containing those members therein, and an abutment section 27.

As described above, the casing 26 contains the lens case 23, the lighting unit 24, and the illumination power supply 25, and is made of a resin.

The casing 26 is formed of a cylindrical body whose one end is opened and which is of a substantially rectangular solid.

A power switch 29 of the illumination power supply 25 is disposed on a side surface of the casing 26, and the power switch 29 is switched by the user to control the lighting state of the illumination power supply 25.

The lens case 23 has the lens tube 22 as described above.

An objective lens 21A, a field lens 21B, and a converging lens 21C are stored in the interior of the lens tube 22.

The objective lens 21A, the field lens 21B, and the converging lens 21C are a single lens in this embodiment, respectively. However, at least one of the objective lens 21A, the field lens 21B, and the converging lens 21C may be configured with the combination of a plurality of lenses. When the objective lens 21A, the field lens 21B, or the converging lens 21C is formed of a plurality of lenses, the plurality of lenses that constitute the objective lens 21A, the field lens 21B, or the converging lens 21C may be arranged in close contact with each other or with gaps therebetween.

The objective lens 21A allows the image light from the object to be imaged to pass therethrough, to thereby magnify the image light. With the above-mentioned configuration, the magnified image is taken. In this embodiment, the objective lens 21A is an 100 power lens.

The field lens 21B has a function of allowing the image light that has passed through the objective lens 21A to pass therethrough to adjust the passed image light so as to enter the entire converging lens 21C. The field lens 21B of this embodiment has the same diameter as that of the converging lens 21C, and the diameter of the image light that has passed through the field lens 21B when reaching the converging lens 21C becomes equal to the diameter of the converging lens 21C. Note that, in this embodiment, because the converging lens 21C has the same diameter as that of the field lens 21B, the fact that the diameter of the image light that has passed through the field lens 21B when reaching the converging lens 21C becomes equal to the diameter of the converging lens 21C means that the field lens 21B has a function of converting the image light from the objective lens 21A that allows the image light to pass therethrough into a collimated light.

The converging lens 21C allows the image light that has passed through the field lens 21 B to pass therethrough, to thereby converge the image light that has passed through the converging lens 21C on the pupil of the camera lens 42 with a solid angle that is equal to or larger than the viewing angle of the camera lens 42. In this embodiment, the converging lens 21C has the same diameter as that of the field lens 21 B. In this embodiment, the converging lens 21C converges the image light that has passed through the field lens 21C on the pupil of the camera lens 42 with a solid angle that is substantially equal to the viewing angle of the camera lens 42. The converging lens 21C may be designed so as to converge the passed image light on an area of the pupil of the camera lens 42.

An aperture 21D is also disposed in the interior of the lens tube 22. The aperture 21D has a function of narrowing the diameter of the image light and deepening the focal depth when the image is taken by the camera. The aperture 21D shown in FIG. 4 is drawn so as to be positioned closer to a side of the object to be imaged than the objective lens 21A. However, there is a case in which the aperture 21D is positioned between the objective lens 21A and the field lens 21B. Also, in the case where the objective lens 21A or the field lens 21B is formed of a plurality of lenses, the aperture 21D may be disposed between the plurality of lenses that constitute the objective lens 21A or the field lens 21B.

The lens case 23 is fixed within the casing 26. The lens case 23 is designed such that the optical axis of the camera lens 42 which is exposed from the base 10 coincides with the optical axes of the objective lens 21A, the field lens 21B, and the converging lens 21C, and one end of the lens case 23 is projected to the other end side of the casing 26 when the casing 26 is fitted with the case 10 in a method that will be described later.

A portion of the lens case 23 which is projected from the casing 26 is called "projection 28". Three projections 23a are disposed at given intervals on the peripheral edge of the leading portion of the projection 28. The projection 28 is configured in an outer gear in the plan view. The thickness of the projection 23a is set to be substantially equal to the height of the blocking piece 16.

The contour shape of the leading end of the projection 28 is substantially identical to the contour shape of the camera shape 11, and the size of the leading end is slightly smaller than the camera opening 11. For that reason, the leading end of the projection 28 can be inserted into the camera opening 11.

The length of the projection 28 to the lower surface of the projection 23a shown in FIG. 4 is slightly longer than the thickness of the bottom plate 10A of the base 10.

The attachment of the magnifying section 20 to the base 10 is conducted while the magnifying section 20 rotates in a direction of A shown in FIG. 2 until the projection 23a comes in contact with the blocking piece 16 in a state where the leading end of the projection 28 is inserted into the lens opening 11.

The lighting unit 24 is designed so as to irradiate the object to be imaged with the given illumination light, and is configured by an LED in this embodiment. The lighting unit 24 is fixed within the casing 26.

The lighting of the lighting unit 24 is controlled by the power switch 29 of the illumination power supply 25.

The illumination power supply 25 is a power supply of the lighting unit 24, and is formed of a dry battery in this embodiment. The illumination power supply 25 is fixed within the casing 26 so as to be adjacent to the lens case 23 in this embodiment.

In this embodiment, the abutment section 27 is cylindrical with a cross section of a field track shape, and the diameter of the outer periphery is set to be substantially equal to the diameter of the inner periphery of the opening portion of the casing 26. With the above-mentioned configuration, the abutment section 27 is slidably fitted into the interior of the casing 26 in the optical axial direction in a state where there is substantially no gap between the abutment section 27 and the inner periphery of the casing 26.

The abutment section 27 is moved far from the camera-equipped mobile phone 40 in parallel to the optical axial direction, and exposed from the casing 26, and a part of the abutment section 27 (the leading end in this embodiment) is abutted against the object to be imaged (or its periphery), an optical distance between the object to be imaged and the objective lens 21A can be positioned. The abutment section 27 is configured so as to focus the image light on the object to be imaged when the camera lens 42, the objective lens 21A, the field lens 21B, and the converging lens 21C are combined in the above-mentioned positioned state.

Hence, when the abutment section 27 is abutted against the object to be imaged in a state where the abutment section 27 is exposed from the casing 26, the object to be imaged is imaged in the focused state.

When the camera-equipped mobile phone 40 is used as a microscope of the handy type by the aid of the camera-equipped mobile phone attachment 1 of this embodiment, the leading end of the abutment section 27 is abutted against the object to be imaged as will be described later.

Also, when the camera-equipped mobile phone 40 is used as a microscope of the generally used stand fixed type, the abutment section 27 is moved in parallel to the optical axial direction and is stored in the interior of the casing 26, thereby making it possible to prevent the abutment section 27 from obstructing the imaging.

The camera-equipped mobile phone attachment 1 of this embodiment has a plurality of magnifying sections 20. Each of the magnifying section 20 includes the lens case 23 and the lighting unit 24, and the magnification of the objective lens 21A and the kind of the lighting unit which are included in each of the lens cases 23 are different from each other.

Each of the plurality of magnifying sections 20 includes the objective lens 21A having a given magnification, respectively, and the lighting unit 24 that conducts appropriate illumination when magnifying the image by the aid of the objective lens 21A therein.

As described above, the magnifying sections 20 of the camera-equipped mobile phone attachment 1 according to this embodiment are brought in a state where the objective lens 21A and the lighting unit 24 suitable to take the image by the aid of the objective lens 21A are integrated, and the plurality of magnifying sections 20 are prepared. As a result, the appropriate magnifying section 20 is merely fitted with the base 10, thereby not only magnifying the image at an appropriate magnification, but also automatically selecting the lighting unit 24 that best suits the objective lens 21A that gives the magnification.

Alternatively, instead of providing the plurality of magnifying sections 20, the magnifying section 20 may be configured in such a manner that the lens case 23 is removed from the magnifying section 20, and may be replaced with a lens case 23 having an objective lens 21A with another different magnification. That is, the plurality of lens cases 23 having the objective lenses 21A with the different magnifications therein can be provided. With the above-mentioned configuration, when the appropriate lens case 23 is merely fitted with the casing 26, the image can be magnified at an appropriate magnification.

In this case, the plurality of different lighting units 24 are prepared in advance, and the lighting unit 24 is replaced with a lighting unit 24 that corresponds to the objective lens 21A which is included in the lens case 23 every time the lens case 23 is replaced. Alternatively, the lighting unit 24 that is suitable to take an image by the aid of the objective lens 21A which is included in the lens case 23 can be fixed to the lens case 23. With the above-mentioned configuration, when the appropriate lens case 23 is merely fitted with the casing 26, not only the image is magnified at an appropriate magnification, but also the optimum lighting unit 24 for the objective lens 21A that gives the appropriate magnification is obtained.

FIG. 2(c) shows a stand 30 of the camera-equipped mobile phone attachment 1 according to this embodiment. The stand 30 is used in the case where the camera-equipped mobile phone 40 is used as the microscope. On the other hand, the stand 30 is not used in the case where the camera-equipped mobile phone 40 is used as the telescope.

The stand 30 supports the base 10, and includes a telescopic arm 31, a pedestal 32, and a camera screw bolt 33.

The pedestal 32 is abutted against the ground and supports the entire camera-equipped mobile phone attachment 1. The pedestal 32 has a plate-like shape in this embodiment.

The telescopic arm 31 includes an inner cylinder 31A having a thin plate shape, an outer cylinder 31B having a thin plate shape which includes the inner cylinder 31A therein, and an arm screw 31C. Those members are slidably vertically coupled to each other by turning the arm screw 31C through the rack system.

With the above-mentioned configuration, when the arm screw 31C turns in one direction, the telescopic arm 31 extends, and when the arm screw 31C turns in an opposite direction, the telescopic arm 31 retracts.

In the telescopic arm 31, an end of the inner cylinder 31A is fixed to a given position of the pedestal 32 so that the telescopic arm 31 is substantially perpendicular to the pedestal 32. A camera screw nut not shown is pierced at an end of the outer cylinder 31B which is positioned at an opposite side of the pedestal 32.

As shown in FIG. 5, the stand 30 and the base 10 are fixed to each other by screwing the camera screw bolt 33 with the camera screw nut 14, and the base 10 can be moved vertically, that is, in parallel to the optical axial direction by turning the arm screw 31C.

Subsequently, a description will be given of a method of using the camera-equipped mobile phone attachment 1.

First, in the first using method, as shown in FIG. 5, the camera-equipped mobile phone 40 is attached to and used with the camera-equipped mobile phone attachment 1. In this case, the camera-equipped mobile phone 40 is used as the microscope.

In this case, it is preferable that the base 10, the magnifying section 20 (magnifying section 20 including the objective lens 21A with a magnification suitable for the object to be imaged), and the stand 30 be assembled into a state shown in FIGS. 2 and 5 by the above-mentioned method, and the camera-equipped mobile phone 40 be fixed to the base 10.

In the state, the camera function that is provided to the camera-equipped mobile phone 40 is used, the object to be displayed is magnified and displayed on the display 41, and the camera-equipped mobile phone 40 is used as the microscope.

Specifically, the arm screw 31C turns in a state where the object to be imaged is put on the pedestal 32 of the stand 30, to thereby adjust a distance between the magnifying section 20 and the object to be imaged to perform focusing. Also, the power switch 29 of the magnifying section 20 is operated to turn on the lighting unit 24, and an appropriate illumination light is given to the objective lens 21A by means of the lighting unit 24.

With the above-mentioned configuration, the image that is taken by the image pickup device is displayed on the display 41 as the magnified image due to the existence of the objective lens 21A.

In the above-mentioned case where the camera-equipped mobile phone 40 is used as the microscope, the abutment section 27 is moved in parallel to the optical axial direction and received in the interior of the casing 26, to thereby prevent the obstruction of the imaging.

As described above, the camera-equipped mobile phone 40 can be used as the microscope. The imaging per se can be conducted by the function that is originally provided by the camera of the camera-equipped mobile phone 40.

Although depending on the function of the camera-equipped mobile phone 40 to be used, the data of the image that has been obtained by imaging is recorded in an internal memory that is provided to the camera-equipped mobile phone 40, output to the external from the camera-equipped mobile phone 40, or transmitted by the aid of the electronic mail function that is provided by the camera-equipped mobile phone 40, in use.

When it becomes unnecessary to use the camera-equipped mobile phone 40 as the microscope, the camera-equipped mobile phone 40 is removed from the camera-equipped mobile phone attachment 1.

Subsequently, a description will be given of a second method of using the camera-equipped mobile phone attachment 1.

Figure 6:
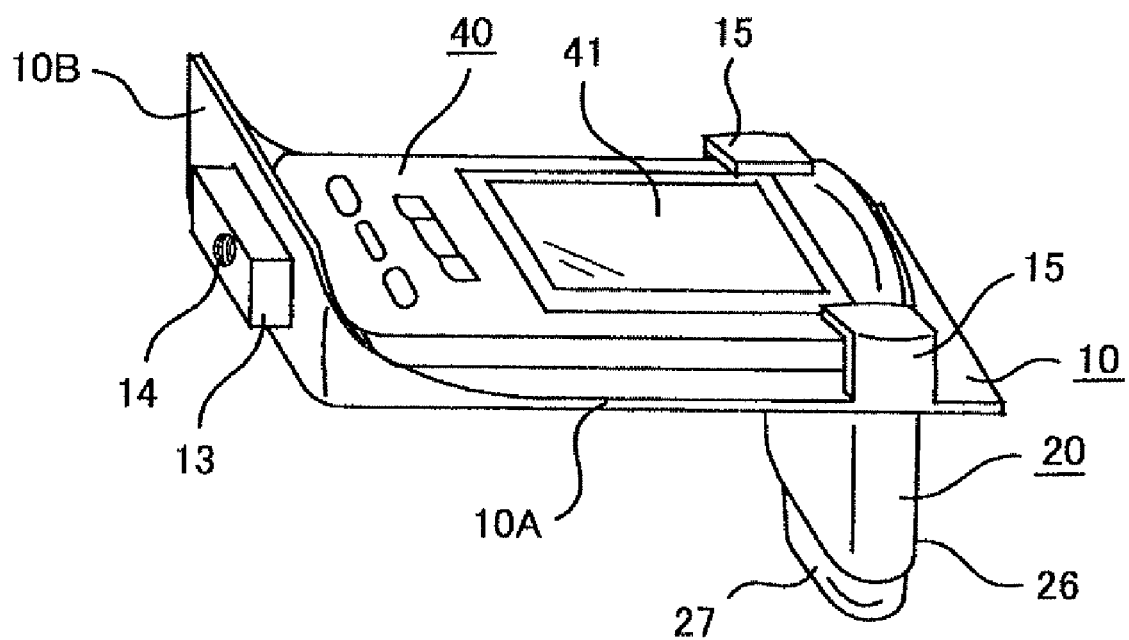
FIG. 6 is a diagram showing a state in which the camera-equipped mobile phone attachment according to the embodiment of the present invention is used as a microscope of a handy type.

The second using method of the camera-equipped mobile phone attachment 1 is a case in which the base 10 to which the camera-equipped mobile phone 40 and the magnifying section 20 are fitted is gripped with the user's hand and used as shown in FIG. 6. With the above-mentioned configuration, the camera-equipped mobile phone 40 can be used as the microscope of a handy type. In this case, the stand 30 is not used.

In this case, the camera-equipped mobile phone 40 is fitted with the base 10 as shown in FIG. 6. In this situation, one end of the camera-equipped mobile phone 40 in the longitudinal direction is abutted against the back surface 10B. In this state, the camera lens 42 of the camera-equipped mobile phone 40 is exposed from the bottom plate 10A through the camera opening 11.

Subsequently, the magnifying section 20 is fitted with the base 10 as shown in FIG. 6.

Then, the abutment section 27 is drawn from the magnifying section 20, and a leading end of the drawn abutment section 27 is abutted against the object to be imaged to take an image.

Since the imaging that is conducted in the above-mentioned manner is executed in a state where the leading end of the abutment section 27 is abutted against the object to be imaged, a problem on camera shaking hardly occurs. Also, as described above, since the position of the leading end of the abutment section 27 which is drawn from the magnifying section 20 coincides with the focus position, when the surrounding of the opening at the leading end of the abutment section 27 is abutted against the object to be imaged, the object to be imaged which is positioned in the opening can be automatically focused.

A description will be given of the behavior of the image light when the magnified image is taken by the aid of the camera-equipped mobile phone attachment 1 as described above with reference to FIGS. 7 and 8.

Figure 7:
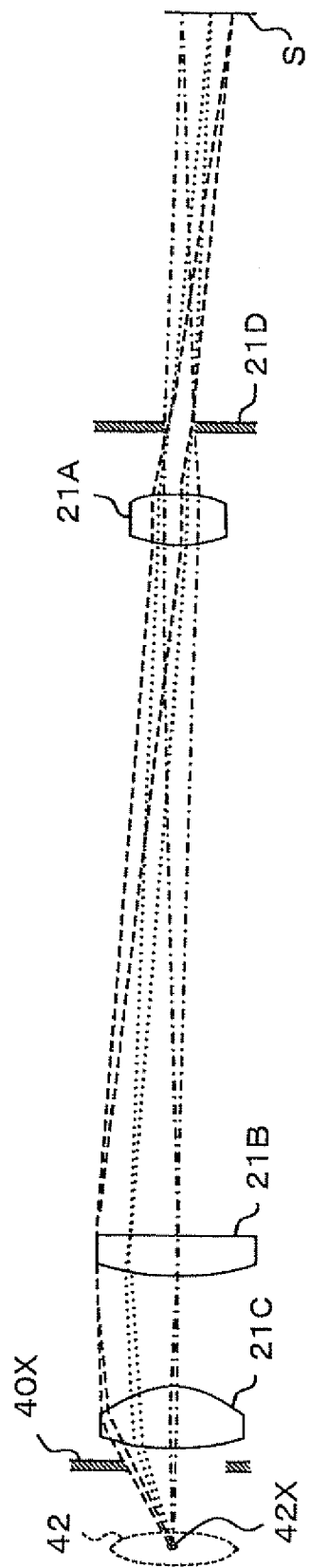
FIG. 7 is a diagram showing the behavior of an image light in the case where an image is taken by using the camera-equipped mobile phone attachment according to the embodiment of the present invention.
Figure 8:
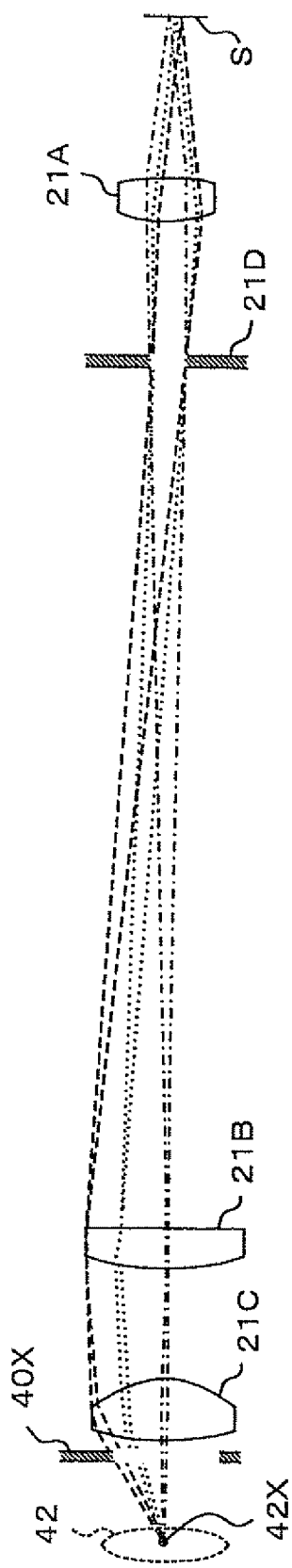
FIG. 8 is a diagram showing the behavior of an image light in the case where an image is taken by using the camera-equipped mobile phone attachment according to the embodiment of the present invention.

FIGS. 7 and 8 are perspective views of the magnifying section 20 viewed from a side in the case where the magnified image is taken by the aid of the above-mentioned camera-equipped mobile phone attachment 1.

FIG. 7 shows a case where the magnified image of 50 magnifications is taken by the camera of the camera-equipped mobile phone 40, and FIG. 8 shows a case where the magnified image of 200 magnifications is taken by the camera of the camera-equipped mobile phone 40.

In the case shown in FIG. 7 as well as the case shown in FIG. 8, the converging lens 21C, the field lens 21B, and the objective lens 21A are linearly aligned from the side of the opening that is defined in the main body 40X of the camera-equipped mobile phone 40 for exposing the camera lens 42 in a state where those optical axes coincide with the optical axis of the camera lens 42. In the case shown in FIG. 7, an aperture 21D having a doughnut shape whose center is opened is disposed at a position farther from the camera lens 42 than the objective lens 21A. In the case shown in FIG. 8, the aperture 21D is disposed between the objective lens 21A and the field lens 21B.

When the image is taken in that state, a light from a surface to be imaged S is converged on the pupil 42X of the camera lens 42. In FIGS. 7 and 8, the image lights from different points on the surface to be imaged S are indicated by three kinds of lines including the dotted line, the broken line, and the dashed line, respectively. Also, in FIGS. 7 and 8, only the half of the light that is directed toward the pupil 42X (upper half of FIGS. 7 and 8) is shown.

In the case shown in FIG. 7, the image light from the surface to be imaged S passes through the aperture 21D so as to be narrowed, and thereafter is directed toward the objective lens 21A. The image light passes through the objective lens 21A so as to be magnified, is directed toward the field lens 21B, and is directed toward the converging lens 21C as a collimated light. Then, the image light passes through the converging lens 21C so as to be focused, and is then converged on the pupil 42X of the camera lens 42. A solid angle having the pupil 42X as a vertex in the case where the image light that has passed through the converging lens 21C enters an area of the pupil 42X is substantially identical to the viewing angle of the camera lens 42.

In the case shown in FIG. 8, the image light from the surface to be imaged S is directed toward the objective lens 21A. The image light passes through the objective lens 21A so as to be magnified, and passes through the aperture 21D so as to be narrowed. After that, the image light is directed toward the field lens 21B, and is directed toward the converging lens 21C as collimated light. Then, the image light passes through the converging lens 21C so as to be focused, and is then converged on the pupil 42X of the camera lens 42. A solid angle having the pupil 42X as a vertex in the case where the image light that has passed through the converging lens 21C enters the pupil 42X is substantially identical to the viewing angle of the camera lens 42.

As described above, the image with high magnification which does not include the black portion having no image is obtained by the camera of the camera-equipped mobile phone 40.

FIRST MODIFIED EXAMPLE

A first modified example of the camera-equipped mobile phone attachment 1 described above will be described with reference to FIG. 9.

The camera-equipped mobile phone attachment according to the first modified example is basically configured in the same manner as the camera-equipped mobile phone attachment 1 described above.

A difference of the camera-equipped mobile phone attachment according to the first modified example from the camera-equipped mobile phone attachment 1 described above resides in that each of the objective lens 21A, the field lens 21B, and the converging lens 21C in the camera-equipped mobile phone attachment 1 described above is made up of a single lens whereas each of the objective lens 21A, the field lens 21B, and the converging lens 21C in the camera-equipped mobile phone attachment according to the first modified example is made up of a plurality of lenses. Naturally, the objective lens 21A, the field lens 21B, and the converging lens 21C each of which is made up of the combination of the plurality of lenses have the same function as that of the objective lens 21A, the field lens 21B, and the converging lens 21C each of which is made up of the single lens. Therefore, the behavior of the image light when the image is taken by the aid of the camera-equipped mobile phone attachment is not different from the behavior of the image light when the magnified image is taken by the aid of the above-mentioned camera-equipped mobile phone attachment 1 as shown in FIG. 9.

Figure 9:
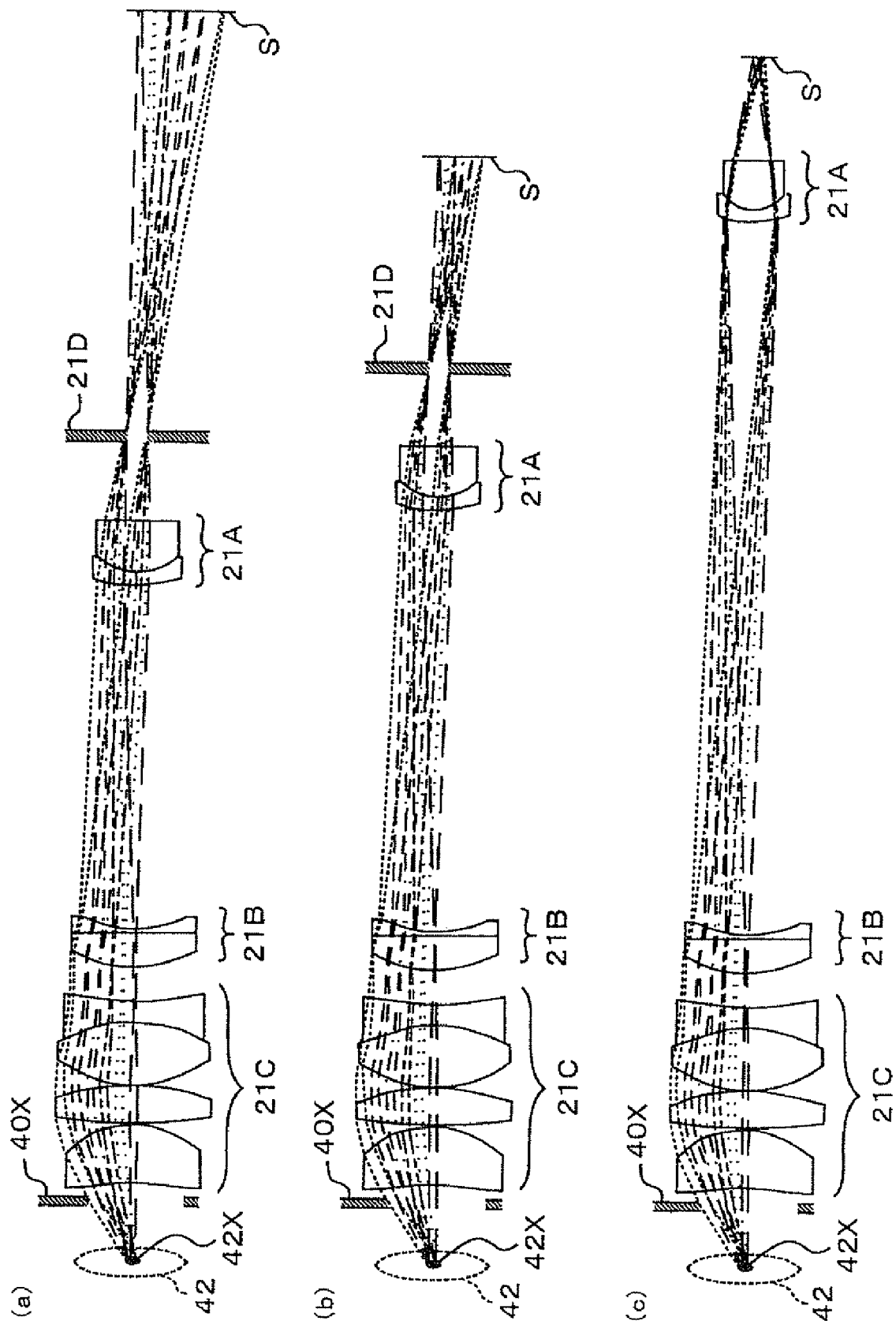
FIG. 9 are diagrams showing the behavior of an image light in the case where an image is taken by using the camera-equipped mobile phone attachment according to a first modified example of the present invention.

FIG. 9 show the behavior of the image light in the case where each of the objective lens 21A, the field lens 21B, and the converging lens 21C is made up of a plurality of lenses. In FIG. 9, the image lights from different points on the surface to be imaged S are each indicated by six different kinds of lines such as the dotted lines and the broken lines. Also, FIG. 9 show only the half of the light that is directed toward the pupil 42X (upper half of FIG. 9).

FIG. 9(a) shows a case of 25 magnifications, FIG. 9(b) shows a case of 100 magnifications, and FIG. 9(c) shows a case of 200 magnifications.

In the case of FIG. 9(c), there is provided no aperture.

SECOND MODIFIED EXAMPLE

Next, a description will be given of a second modified example of the camera-equipped mobile phone attachment 1 described above with reference to FIG. 10.

The camera-equipped mobile phone attachment according to the second modified example is basically configured in the same manner as the camera-equipped mobile phone attachment 1 described above.

Differences of the camera-equipped mobile phone attachment according to the second modified example from the camera-equipped mobile phone attachment 1 described above reside in that no field lens 21B exists among the objective lens 21A, the field lens 21B, and the converging lens 21C in the camera-equipped mobile phone attachment 1 described above, and in that the objective lens 21A and the converging lens 21C each of which has been made up of a single lens are made up of a plurality of lenses in the same manner as in the first modified example. The objective lens 21A in the camera-equipped mobile phone attachment according to the second modified example is used to take a picture with 10 magnifications by the aid of the camera of the camera-equipped mobile phone.

In this case, the stand 30 of the camera-equipped mobile phone attachment 1 is not used.

Figure 10:
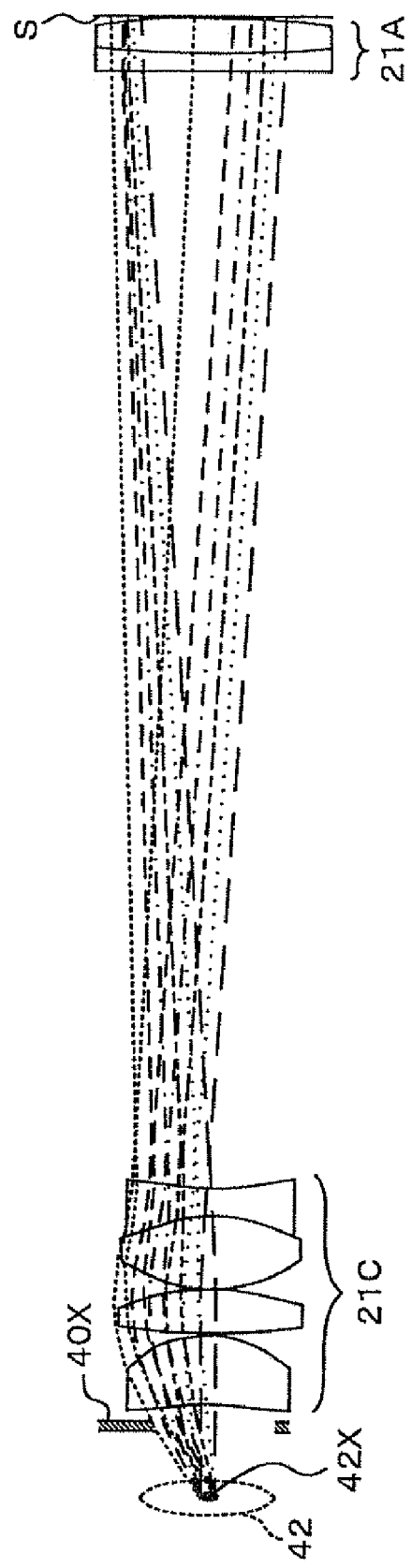
FIG. 10 is a diagram showing the behavior of an image light in the case where an image is taken by using the camera-equipped mobile phone attachment according to a second modified example of the present invention.

The behavior of the image light in the case where the image is taken by the aid of the camera-equipped mobile phone attachment is shown in FIG. 10. The behavior of the image light in this case is not basically different from the behavior of the image light obtained when the magnified image is taken by the aid of the camera-equipped mobile phone attachment 1 described above. The light that has passed through the objective lens 21A directly reaches the converging lens 21C, and is focused on the pupil 42X of the camera lens 42.

FIG. 10 shows the behavior of the image light in the case where each of the objective lens 21A and the converging lens 21C is made up of a plurality of lenses. In FIG. 10, the image lights from different points on the surface to be imaged S are each indicated by six different kinds of lines such as the dotted lines and the broken lines. FIG. 10 also shows only the half of the light that is directed toward the pupil 42X (upper half of FIG. 10).

THIRD MODIFIED EXAMPLE

Next, a description will be given of a third modified example of the camera-equipped mobile phone attachment 1 described above with reference to FIG. 11.

The camera-equipped mobile phone attachment 1 according to the third modified example is basically configured in the same manner as the camera-equipped mobile phone attachment 1 described above.

A difference of the camera-equipped mobile phone attachment according to the third modified example from the camera-equipped mobile phone attachment 1 described above resides in that the lens tube 22 and the lens case 23 in the camera-equipped mobile phone attachment according to the third modified example are separated into two pieces.

Figure 11:
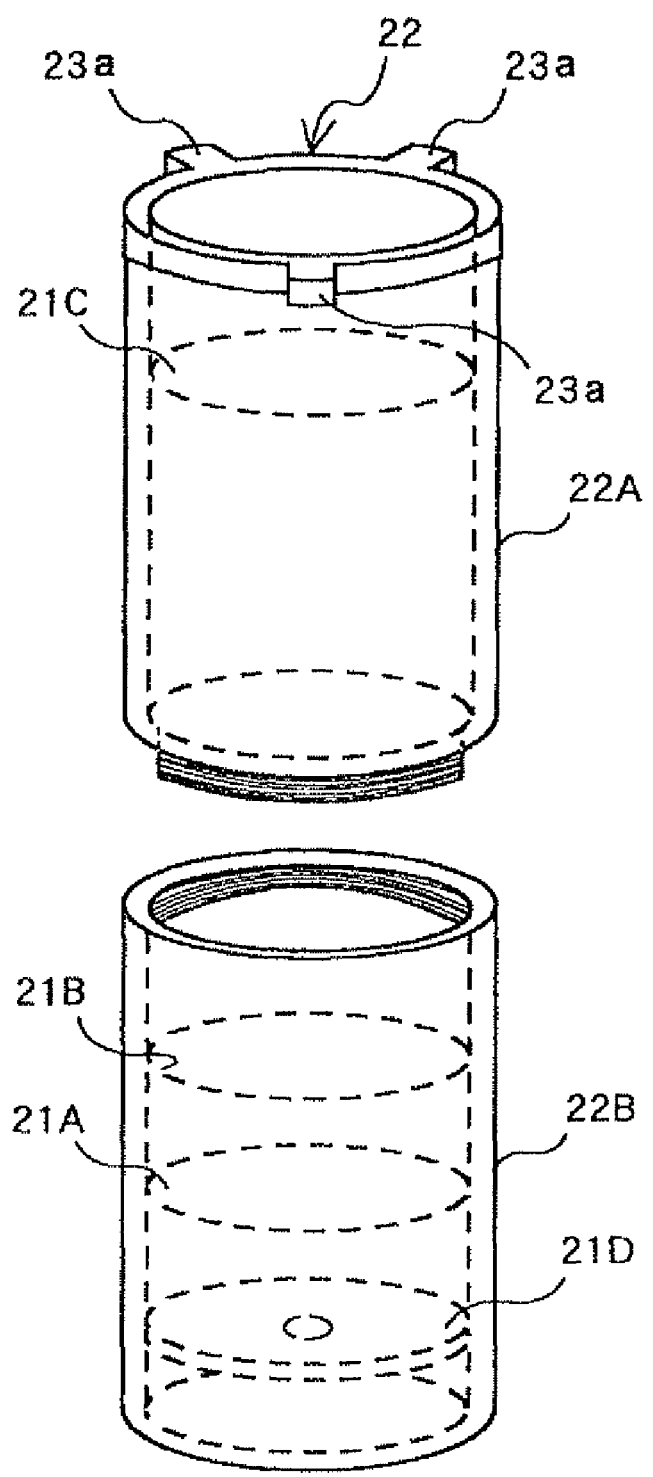
FIG. 11 is a perspective view showing a lens tube of the camera-equipped mobile phone attachment according to a third modified example of the present invention.

FIG. 11 is a diagram showing the lens tube 22 in the camera-equipped mobile phone attachment according to the third modified example. The lens tube 22 in the camera-equipped mobile phone attachment is separated into two pieces 22A and 22B) as shown in FIG. 11. Those two pieces 22A and 22B are also detachably attached to each other. In this embodiment, the outer periphery of one of facing portions of the two pieces 22A and 22B, and the inner periphery of the other facing portion are each threaded, and those two pieces 22A and 2213 are screwed with each other. As a result, the two pieces 22A and 22B are detachably attached to each other.

The converging lens 21C is provided in the piece 22A which is one of those two pieces 22A and 22B, and the objective lens 21A, the field lens 21B, and the aperture 21D are provided in the piece 22B that is the other piece, respectively.

In this embodiment, a plurality of pieces 22B each having the appropriate objective lens 21A, field lens 21B, and aperture 21D that are incorporated thereinto are prepared. The user is capable of replacing the piece 22B on the basis of desired imaging conditions related to the magnifications. The image light that has passed through the converging lens 21C is guided to the pupil 42X of the camera lens 42 even if the piece 22B is replaced with another one so far as the light from the field lens 21B is collimated light.

The invention claimed is:

1. A magnifying attachment which is attached to and used with a camera having a camera lens, for magnifying an image to be taken by the camera, the magnifying attachment comprising:

a main body which is detachably fixed to the camera;
an objective lens which is fitted with the main body;
a converging lens which is fitted with the main body,
wherein the objective lens allows an image light from an object to be imaged to pass therethrough to magnify the image light, and wherein the converging lens allows the image light that has passed through the objective lens to pass therethrough to converge the passed image light on a pupil of the camera lens of the camera with a solid angle that is substantially equal to or larger than a viewing angle of the camera lens, when the main body is fitted with the camera; and
a field lens that is fitted with the main body,
wherein the field lens allows the image light that has passed through the objective lens to pass therethrough to adjust the passed image light so as to enter the entire converging lens, and wherein the converging lens allows the image light that has passed through the field lens to pass therethrough to converge the passed image light on the pupil of the camera lens with a solid angle that is substantially equal to or larger than a viewing angle of the camera lens, when the main body is fitted with the camera, and
wherein the main body is equipped with an aperture that narrows the image light to deepen a focal depth when the main body is fitted with the camera.

2. A magnifying attachment according to claim 1, wherein the converging lens allows the image light that has passed through the objective lens to pass therethrough to converge the passed image light on a pupil of the camera lens of the camera with a solid angle that is equal to or larger than a viewing angle of the camera lens, when the main body is fitted with the camera, and
wherein the converging lens allows the image light that has passed through the field lens to pass therethrough to converge the passed image light on the pupil of the camera lens with a solid angle that is equal to or larger than a viewing angle of the camera lens, when the main body is fitted with the camera.

3. A magnifying attachment according to claim 1, wherein the converging lens allows the image light that has passed through the objective lens to pass therethrough to converge the passed image light within an area of the pupil of the camera lens provided to the camera with a solid angle that is substantially equal to a viewing angle of the camera lens.

4. A magnifying attachment according to claim 1, wherein the field lens converts the image light that has passed through the field lens into a collimated light.

5. A magnifying attachment according to claim 4, wherein the converging lens and the field lens have the same diameter.

6. A magnifying attachment according to claim 1, wherein the main body can be detachably fixed to a fixture, wherein the fixture can be detachably fixed with the camera, and wherein the main body is fixed to the camera through the fixture.

7. A magnifying attachment according to claim 1, further comprising a lighting unit that can irradiate the object to be imaged with an illuminations light when imaging is carried out.

8. A magnifying attachment according to claim 1, wherein the camera is a camera that is fitted with a camera-equipped mobile phone.

9. A magnifying attachment according to claim 1, wherein the objective lens is detachably attached to the main body.

10. A magnifying attachment according to claim 1, wherein the objective lens and the field lens are detachably attached to the main body.

11. A magnifying attachment according to claim 1, wherein the objective lens and the field lens are integrated.

12. A magnifying attachment according to claim 1, wherein the magnifying attachment includes only three lenses through which the image light passes, the three lenses comprising the objective lens, the converging lens, and the field lens.

13. A magnifying attachment according to claim 12, wherein at least one of the objective lens, the converging lens, and the field lens is formed of a plurality of lenses.

\* \* \* \* \*